US012577124B2

(12) United States Patent
Landwehr et al.

(10) Patent No.: US 12,577,124 B2
(45) Date of Patent: Mar. 17, 2026

(54) FEEDSTOCK COMPOSITE WITH CARBONACEOUS MATERIAL HAVING A TAILORED DENSITY

(71) Applicant: Kronos International, Inc., Leverkusen (DE)

(72) Inventors: Frank Landwehr, Gladbeck (DE); Thomas Pierau, Leverkusen (DE); Beawer Barwari, Cologne (DE); Mitja Medved, Leverkusen (DE); Oliver Gnotke, Cologne (DE)

(73) Assignee: Kronos International, Inc., Leverkusen (DE)

( * ) Notice: Subject to any disclaimer, the term of this patent is extended or adjusted under 35 U.S.C. 154(b) by 393 days.

(21) Appl. No.: 18/370,076

(22) Filed: Sep. 19, 2023

(65) Prior Publication Data

US 2024/0092651 A1 Mar. 21, 2024

(30) Foreign Application Priority Data

Sep. 20, 2022 (EP) .................................... 22196476

(51) Int. Cl.
 *C22B 1/242* (2006.01)
 *C01G 23/02* (2006.01)

(52) U.S. Cl.
 CPC .............. *C01G 23/02* (2013.01); *C22B 1/242* (2013.01)

(58) Field of Classification Search
 CPC ......... C01G 23/02; C22B 1/242; C22B 1/243; C22B 1/244; C22B 1/245; C22B 7/04; C22B 34/12
 See application file for complete search history.

(56) References Cited

U.S. PATENT DOCUMENTS

| | | | | | |
|---|---|---|---|---|---|
| 5,389,353 | A | * | 2/1995 | Glaeser | C22B 34/1222 423/78 |
| 7,651,547 | B2 | * | 1/2010 | Nuber | C21B 13/0033 266/172 |
| 9,132,482 | B2 | * | 9/2015 | Maskrot | C01B 32/90 |
| 2007/0178028 | A1 | * | 8/2007 | Fukasawa | B01J 8/18 422/240 |
| 2018/0183060 | A1 | * | 6/2018 | Spahr | H01M 10/0525 |
| 2019/0144337 | A1 | * | 5/2019 | Bernard | C22B 1/244 106/447 |

FOREIGN PATENT DOCUMENTS

WO WO-2025195919 A1 * 9/2025 ............. C22B 59/00

OTHER PUBLICATIONS

Form PCT/ISA/210 (mailed Oct. 2023) in PCT/EP2023/075197.*
Form PCT/ISA/237 (mailed Oct. 2023) in PCT/EP2023/075197.*
Landsberg et al "Conditions Affecting the Formation of Chlorinated Carbon Compounds during Carbochlorination", Metallurgical Transactions B, vol. 19B, Jun. 1988, pp. 477-482.*
Macri et al "Fluidized bed sintering in TiO2 and coke systems", Chemical Engineering Journal 381 (2020) 122711.*
Luckos et al "Fluidization and Flow Regimes of Titaniferous Solids", Ind. Eng. Chem. Res. 2004, 43, 5645-5652.*
Brewer et al "Characterization of Biochar from Fast Pyrolysis and Gasification Systems", Environmental Progress & Sustainable Energy (vol. 28, No. 3), Oct. 2009.*

* cited by examiner

*Primary Examiner* — Mark Kopec
(74) *Attorney, Agent, or Firm* — Troutman Pepper Locke LLP; Mark R. Backofen

(57) ABSTRACT

The invention relates to a feedstock composite comprising a metal oxide fraction and a carbonaceous fraction, a binder composition and the use thereof for obtaining the feedstock composite. Further, the invention refers to a method for obtaining the feedstock composite.

23 Claims, No Drawings

FEEDSTOCK COMPOSITE WITH CARBONACEOUS MATERIAL HAVING A TAILORED DENSITY

RELATED APPLICATIONS

This application claims the benefit of European Patent Application No. EP22196476.0 filed on Sep. 20, 2022.

BACKGROUND

Field of the Invention

The invention relates to a feedstock composite comprising a metal oxide fraction and a carbonaceous fraction, a binder composition and the use thereof for obtaining the feedstock composite. Further, the invention refers to a method for obtaining the feedstock composite.

Technological Background of the Invention

Carbochlorination processes are those in which metal oxides are converted into their corresponding metal chlorides in the presence of chlorine gas and carbonaceous materials. The most common carbochlorination processes involve the processing of feedstocks such as ores and slags containing the oxides of refractory metals, among them, niobium, tantalum, tungsten, molybdenum and rhenium or oxides of rare earth metals like cerium, neodymium, samarium or of oxides of light metals such as aluminum, silicon, vanadium or titanium or other metals like zirconium. Metal chlorides often show relatively low vapor pressure and can be removed from the original solid matrices by sublimation or can be purified by fractionational sublimation or distillation thereby exploiting their varying boiling points, with or without the use of solvents. In addition, metal chlorides can also be purified by extraction or other separation methods.

Usually, metal chlorides are further processed to metals, metal alloys or purified oxides or hydroxides all of which are economically attractive. One of the most important carbochlorination process is the chloride process for the manufacture of titanium dioxide.

Titanium dioxide is either manufactured by the well-established sulfate process or the chloride process. The latter uses a titanium-containing feedstock which is subjected to a carbochlorination process. The thus obtained chlorides are subsequently separated by resublimation or distillation. The titanium tetrachloride is finally converted to titanium dioxide, and the chlorine which is set free from the aforementioned reaction is separated, and reused in the reaction with the titanium-containing feedstock. Amongst other reasons, the reuse of chlorine makes the chloride process economically attractive over the sulphate process.

The coke of choice in this process is petroleum coke with a specific particle size. Due to its small particle size and low weight, fine petroleum coke is discharged from the reactor and is hence unsuitable for carbochlorination reactions per se. The same applies to green and sustainable cokes descending from renewable raw materials such as char coal and bio char due to its low particle density and low poured bulk density. In addition, the demand for petroleum coke increases continuously due to the attractiveness of the chloride process as compared to the sulphate process. The increasing demand leads to higher prices for petroleum coke.

Alternative cokes are available at lower costs, but are due to facts given above unsuitable for carbochlorination processes.

Therefore, there is a need in the art for a feedstock for carbochlorination processes, especially for the titanium dioxide chloride process, with cokes other than petroleum coke having a specific physical properties rendering the material eligible under the prior processes.

SUMMARY OF THE INVENTION

It is the object of the invention to use carbonaceous material as feedstock in carbochlorination processes which was previously unsuitable due to its poured bulk density and the particle density.

This object is achieved by the feedstock composite, the binder composition, the use thereof, and a method for obtaining said feedstock composite.

This present invention provides a feedstock composite comprising a metal oxide fraction and a carbonaceous fraction, characterized in that the carbonaceous fraction has a poured bulk density of about $0.8 \text{ g/cm}^3$ or less, preferably about $0.7 \text{ g/cm}^3$ or less, and more preferably about $0.6 \text{ g/cm}^3$ or less, and a particle density of from about $0.85 \text{ g/cm}^3$ to about $1.15 \text{ g/cm}^3$. This carbonaceous material can be selected among a broad variety of cokes which can be, for example, bio char or originate of pyrolyzed cokes and peats which was previously considered unsuitable for carbochlorination reactions. As a result, expensive petroleum coke with the specific physical properties, amongst others, a poured bulk density of at least $0.8 \text{ g/cm}^3$, is not the only eligible source as carbonaceous feedstock for carbochlorination reactions.

Therefore, in a first aspect, the invention relates to a feedstock composite comprising a metal oxide fraction and a carbonaceous fraction, characterized in that the carbonaceous fraction has a poured bulk density of about $0.8 \text{ g/cm}^3$ or less, preferably about $0.7 \text{ g/cm}^3$ or less, and more preferably about $0.6 \text{ g/cm}^3$ or less, and a particle density of from about $0.85 \text{ g/cm}^3$ to about $1.15 \text{ g/cm}^3$.

In as second aspect, the invention is directed to a binder composition comprising lignosulfonate, carboxymethylcellulose and water glass.

In a further aspect, the invention refers to the use of the binder composition as disclosed herein for obtaining a feedstock composite comprising a metal oxide fraction and a carbonaceous fraction.

In a yet further aspect, the invention relates to a method for obtaining the feedstock composite as disclosed herein, comprising the steps of a) providing a raw mixture of titaniferous material and a carbonaceous material, wherein the carbonaceous material possesses a poured bulk density of about $0.8 \text{ g/cm}^3$ or less, preferably about $0.7 \text{ g/cm}^3$ or less, and more preferably about $0.6 \text{ g/cm}^3$ or less, and b) agglomerating the raw mixture to obtain the feedstock composite.

Further advantageous embodiments of the invention are stated in the dependent claims.

DESCRIPTION OF THE PREFERRED EMBODIMENTS

These and other aspects, features and advantages of the invention become obvious to the skilled person from the study of the following detailed description and claims. Each feature from one aspect of the invention can be employed in any other aspect of the invention. Numerical ranges stated in the format "from x to y" include the mentioned values and the values that are within the respective measuring accuracy as known to the skilled person. If several preferred numerical ranges are stated in this format, it is a matter of course that all ranges formed by the combination of the various end points are also included. The use of the term "about" is intended to encompass all values that lie within the range of the respective measurement accuracy known to the skilled person.

In a first aspect, the invention relates to a feedstock composite comprising a metal oxide fraction and a carbonaceous fraction, wherein the carbonaceous fraction has a poured bulk density of about 0.8 g/cm$^3$ or less, preferably about 0.7 g/cm$^3$ or less, and more preferably about 0.6 g/cm$^3$ or less, and a particle density of from about 0.85 g/cm$^3$ to about 1.15 g/cm$^3$. The poured bulk density of the carbonaceous fraction is preferably not less than preferably about 0.3 g/cm$^3$ or less, and more preferably about 0.2 g/cm$^3$. The feedstock possess preferably a poured bulk density of from about 0.7 g/cm$^3$ to about 2.0 g/cm$^3$, more preferably of from about 0.9 g/cm$^3$ to about 1.7 g/cm$^3$, and more even preferably of from about 1.2 g/cm$^3$ to about 1.5 g/cm$^3$. In a preferred embodiment, the feedstock composite possesses a poured bulk density of from about 0.7 g/cm$^3$ to about 2.0 g/cm$^3$, preferably of from about 0.9 g/cm$^3$ to about 1.7 g/cm$^3$, and more preferably of from about 1.2 g/cm$^3$ to about 1.5 g/cm$^3$. In yet another preferred embodiment, the feedstock composite possesses the form of a particle, and preferably the particle has a size of from about 0.1 mm to about 6.0 mm, preferably of from about 0.3 mm to about 4.0 mm, and more preferably of from about 0.5 mm to about 3.0 mm rendering the composite highly suitable for carbochlorination processes.

"Poured bulk density", as used herein relates to the mass per volume of the composite feedstock and a continuous fluid filling the voids between the composite feedstock, wherein the fluid is air and the individual components of the feedstock material must not dissolve into each other. The procedure described in DIN 53468 was used to determine the poured bulk density. "Particle density", as used herein relates to the mass per volume of a solid. The procedure described in ISO 12154 was used to determine the poured bulk density.

The carbonaceous fraction is preferably selected from the group consisting of fine petroleum coke, recycled petroleum coke, bio char, char coal, pyrolyzed brown coal, pyrolyzed peat, and pyrolyzed coke can be used. Further, substances such as cokes generated from organic recycled materials or secondary or tertiary raw materials by e.g. pyrolysis and similar processes that generate coke, hydrothermally generated coke (HTC) from sewage sludge, manure, wood, straw or other agricultural residues, appropriate fractions of municipal waste. "Fine petroleum coke", as used herein refers to a petroleum coke with a poured bulk density of about 0.5 g/cm$^3$ or less, preferably about 0.4 g/cm$^3$ or less.

The metal oxide fraction can be any metal oxide used as starting material of carbochlorination process comprised of any metal of interest such refractory metals, among them, niobium, tantalum, tungsten, molybdenum and rhenium, rare earth metals like cerium, neodymium, samarium or light metals such as aluminum, silicon, vanadium or titanium or other metals like zirconium. Preferably, the ores and slags containing the above can be used. Preferably, the metal oxide fraction is a titaniferous fraction, and that the titaniferous fraction is selected from the group consisting of natural rutile, synthetic rutile, titaniferous slag, recycled titaniferous slags, residual slags, and ilmenite. The residual slag can originate from the iron and steel industry.

In order to improve the adhesion of the fraction of the feedstock composite, at least one binder can be used selected from the group consisting of sodium chloride, sodium carbonate, bentonite, water glass, carbon black, soth, polyvinyl alcohol, plasticizers, lignosulfonate, carboxymethylcellulose, starch, starch ether, tars, bituminous, molasse, natural resin, pitch, gelatin, and tannin Starch ether can be obtained from Agrana Beteilungs-AG in Vienna, Austria. Preferably, a binder composition comprising lignosulfonate, carboxymethylcellulose, water glass and bentonite, preferably the ratio of lignosulfonate, carboxymethylcellulose, water glass and bentonite is from about 1:2:2:2 to about 1:3:4:4 is employed which is advantageous in carbochlorination processes. Preferably, the feedstock composite further comprises from about 1 wt. % to about 20 wt. %, preferably from about 3 wt. % to about 17.5 wt. %, and more preferably from about 7.5 wt. % to about 13 wt. % of the at least one binder or the binder composition with respect to the total weight of the feedstock composite.

In another aspect, the invention relates to a binder composition comprising lignosulfonate, carboxymethylcellulose, water glass, and bentonite. Preferably, the ratio of lignosulfonate, carboxymethylcellulose, water glass, and bentonite is of from about 1:2:2:2 to about 1:3:4:4 is used.

In yet another aspect, the invention is directed to of the of the binder composition as disclosed herein for obtaining a feedstock composite comprising a metal oxide fraction and a carbonaceous fraction, preferably for obtaining a feedstock composite as described herein. Even more preferably, the binder composition according to the invention is employed for obtaining a feedstock composition for the titanium dioxide chloride process.

In a further aspect, the invention related to a method for obtaining the feedstock composite comprising a metal oxide fraction and a carbonaceous fraction, comprising the steps of
a) providing a raw mixture of a metal oxide material and a carbonaceous material, wherein the carbonaceous material possesses a poured bulk density of about 0.8 g/cm$^3$ or less, preferably about 0.7 g/cm$^3$ or less, and more preferably about 0.6 g/cm$^3$ or less, and
b) agglomerating the raw mixture to obtain the feedstock composite.

The agglomeration in step b) can be accomplished by compacting and/or extrusion and/or wet extrusion, preferably extrusion. Further, pressure agglomeration, dry agglomeration, tumble growth agglomeration, heating or sintering can also be used.

Preferable, step after step a) and prior to step b), the raw mixture is confected by drying, wetting and/or pre-agglomeration. This step is conducted to prepare the raw mixture for the step b). Apparatuses and techniques are known in the art, for example, a disc pelletizer. The particle size of the feedstock can also be adjusted by common reduction techniques.

The metal oxide fraction can be any metal oxide used as starting material of carbochlorination process comprised of any metal of interest such as refractory metals, among them, niobium, tantalum, tungsten, molybdenum and rhenium, rare earth metals like cerium, neodymium, samarium or light metals such as aluminum, silicon, vanadium or titanium or other metals like zirconium. Preferably, ores and slags containing the above can be used. Preferably, the metal oxide fraction is a titaniferous fraction, and that the titaniferous fraction is selected from the group consisting of natural rutile, synthetic rutile, titaniferous slag, recycled titaniferous slags, residual slags, and ilmenite. The residual slag can originate from the iron and steel industry.

In order to improve the adhesion of the fraction of the feedstock composite, at least one binder can be added in step a) selected from the group consisting of sodium chloride, sodium carbonate, bentonite, water glass, carbon black, soth, polyvinyl alcohol, plasticizers, lignosulfonate, carboxymethylcellulose, starch, starch ether, tars, bituminous, molasse, natural resin, pitch, gelatin, and tannin Starch ether can be obtained from Agrana Beteilungs-AG in Vienna, Austria. Preferably, a binder composition comprising lignosulfonate, carboxymethylcellulose, water glass and bentonite, preferably a ratio of lignosulfonate, carboxymethylcellulose, water glass and bentonite from about 1:2:2:2 to about 1:3:4:4 is employed which is advantageous in carbochlorination processes. Preferably, the feedstock composite further comprises from about 1 wt. % to about 20 wt. %, preferably from about 3 wt. % to about 17.5 wt. %, and more preferably from about 7.5 wt. % to about 13 wt. % of the at least one binder or the binder composition with respect to the total weight of the feedstock composite.

The above descriptions of certain embodiments are made for the purpose of illustration only and are not intended to be limiting in any manner Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The invention claimed is:

1. A feedstock composite comprising a metal oxide fraction and a carbonaceous fraction, wherein the carbonaceous fraction has a carbonaceous fraction poured bulk density of not more than about 0.8 g/cm$^3$ and a particle density of from about 0.85 g/cm$^3$ to about 1.15 g/cm$^3$.

2. The feedstock composite of claim 1, wherein the carbonaceous fraction poured bulk density is not more than about 0.7 g/cm$^3$.

3. The feedstock composite of claim 2, wherein the carbonaceous fraction poured bulk density is not more than about 0.6 g/cm$^3$.

4. The feedstock composite of claim 1, wherein the feedstock composite possesses a feedstock composite poured bulk density of from about 0.7 g/cm$^3$ to about 2.0 g/cm$^3$.

5. The feedstock composite of claim 4, wherein the feedstock composite poured bulk density is from about 0.9 g/cm$^3$ to about 1.7 g/cm$^3$.

6. The feedstock composite of claim 5, wherein the feedstock composite poured bulk density is from about 1.2 g/cm$^3$ to about 1.5 g/cm$^3$.

7. The feedstock composite of claim 1, wherein the carbonaceous fraction is selected from the group consisting of fine petroleum coke, recycled petroleum coke, bio char, char coal, pyrolyzed brown coal, pyrolyzed peat, pyrolyzed coke, and mixtures thereof.

8. The feedstock composite of claim 1, wherein the feedstock composite possesses the form of particles having a size of from about 0.1 mm to about 6.0 mm.

9. The feedstock composite of claim 1, wherein the feedstock composite possesses the form of particles having a size of from about 0.3 mm to about 4.0 mm.

10. The feedstock composite of claim 1, wherein the feedstock composite possesses the form of particles having a size of from about 0.5 mm to about 3.0 mm.

11. The feedstock composite of claim 1, wherein the metal oxide fraction is a titaniferous fraction, and that the titaniferous fraction is selected from the group consisting of natural rutile, synthetic rutile, titaniferous slag, recycled titaniferous slags, residual slags, ilmenite, and mixtures thereof.

12. The feedstock composite of claim 1, further comprising at least one binder selected from the group consisting of sodium chloride, sodium carbonate, bentonite, water glass, carbon black, soth, polyvinyl alcohol, plasticizers, lignosulfonate, carboxymethylcellulose, starch, starch ether, tars, bituminous, molasse, natural resin, pitch, gelatin, tannin, and mixtures thereof.

13. The feedstock composite of claim 12, wherein the at least one binder comprises lignosulfonate, carboxymethylcellulose, water glass and bentonite in a ratio of lignosulfonate, carboxymethylcellulose, water glass and bentonite from about 1:2:2:2 to about 1:3:4:4.

14. The feedstock composite of claim 12, wherein the at least one binder is from about 1 wt. % to about 20 wt. %, with respect to the total weight of the feedstock composite.

15. The feedstock composite of claim 14, wherein the at least one binder is from about 3 wt. % to about 17.5 wt. %, with respect to the total weight of the feedstock composite.

16. The feedstock composite of claim 12, wherein the at least one binder is from about 7.5 wt. % to about 13 wt. %, with respect to the total weight of the feedstock composite.

17. The feedstock composite of claim 1, wherein:
the carbonaceous fraction poured bulk density is not more than about 0.6 g/cm$^3$;
the feedstock composite has a feedstock composite poured bulk density from about 1.2 g/cm$^3$ to about 1.5 g/cm$^3$;
the carbonaceous fraction is selected from the group consisting of fine petroleum coke, recycled petroleum coke, bio char, char coal, pyrolyzed brown coal, pyrolyzed peat, pyrolyzed coke, and mixtures thereof;
the feedstock composite possesses the form of particles having a size of from about 0.5 mm to about 3.0 mm;
the metal oxide fraction is a titaniferous fraction, and that the titaniferous fraction is selected from the group consisting of natural rutile, synthetic rutile, titaniferous slag, recycled titaniferous slags, residual slags, ilmenite, and mixtures thereof;
the feedstock composite further comprises at least one binder comprising lignosulfonate, carboxymethylcellulose, water glass and bentonite in a ratio of lignosulfonate, carboxymethylcellulose, water glass and bentonite from about 1:2:2:2 to about 1:3:4:4; and
wherein the at least one binder is from about 7.5 wt. % to about 13 wt. %, with respect to the total weight of the feedstock composite.

18. A method for producing the feedstock composite of claim 1, comprising:
a) combining a metal oxide material and a carbonaceous material to form a raw mixture, wherein the carbonaceous material possesses a poured bulk density of not more than about 0.8 g/cm$^3$; and
b) agglomerating the raw mixture to obtain the feedstock composite.

19. The method of claim 18, wherein the metal oxide fraction is a titaniferous fraction selected from the group consisting of natural rutile, synthetic rutile, titaniferous slag, recycled titaniferous slags, residual slags, ilmenite, and mixtures thereof.

20. The method of claim 18, further comprising combining at least one binder into the raw mixture prior to step b), wherein the at least one binder is selected from the group consisting of sodium chloride, sodium carbonate, bentonite, water glass, carbon black, soth, polyvinyl alcohol, plasticizers, lignosulfonate, carboxymethylcellulose, starch, starch ether, tars, bituminous, molasse, natural resin, pitch, gelatin, tannin, and mixtures thereof.

21. The method of claim 20, wherein the binder composition comprises lignosulfonate, carboxymethylcellulose, water glass, and bentonite, in a ratio of from about 1:2:2:2 to about 1:3:4:4.

22. The method of claim 18, wherein agglomeration in step b) is accomplished by a method selected from the group consisting of compacting, extrusion, wet extrusion, pressure agglomeration, dry agglomeration, tumble growth agglomeration, heating, sintering, and combinations thereof.

23. The method of claim 18, further comprising after step a) and prior to step b):

confecting the raw mixture by a method selected from the group consisting of drying, wetting, pre-agglomeration, and combinations thereof.

* * * * *